May 18, 1954  W. PISCHEL  2,678,558
BALANCING MACHINE WITH ELECTRICAL INDICATING DEVICE
Filed Sept. 11, 1951

*Werner Pischel*
INVENTOR

Patented May 18, 1954

2,678,558

UNITED STATES PATENT OFFICE 2,678,558

BALANCING MACHINE WITH ELECTRICAL INDICATING DEVICE

Werner Pischel, Dusseldorf, Germany

Application September 11, 1951, Serial No. 246,083

3 Claims. (Cl. 73—66)

This invention relates to and has for its object to provide a balancing machine of the kind having an electrical indicating device.

It is well known that balancing machines with electrical indicating devices work on the principle of converting the force of unbalance or oscillation, produced by the unbalance of the body to be balanced, into corresponding alternating current. Various types of electro-mechanical transformers can be employed for such purpose. The testing currents thus produced have a frequency which corresponds to the rotary speed of the body to be balanced, and an amplitude which depends on the magnitude of the unbalance.

It is also known that for the purpose of ascertaining the location of the unbalance an auxiliary alternating current of equal frequency is generated which together with the testing current is delivered to an indicating device preferably of dynamometric or correspondingly acting type. Thus it is possible to deduce the location of the unbalance from the relative phase of the two alternating currents. Namely, when the phases of the two alternating currents are displaced from one another by 90° or 270°, the indicating instrument will read zero, whereas at a phase displacement of 0° or 180° there will be a maximum deflection of the pointer on the scale of the indicating instrument. For the purpose of measuring the location of the unbalance the phase of one of the two alternating currents, preferably that of the auxiliary alternating current, is displaced, in known manner, so long until the instrument indicates zero. The angle by which the phase must be displaced thereby gives the location of the unbalance. If, starting from the phase relation just obtained, the phase is then displaced by 90°, a maximum deflection of the pointer will be obtained on the scale of the indicating instrument, from which the magnitude of the unbalance can be derived.

It is the primary object of the present invention to automatize this measuring method just described which is generally known and by way of example also used in United States Patent No. 2,362,842 so as to eliminate setting errors, further to shorten the balancing operation and to make it foolproof. This is a major feature of advantage of considerable importance particularly in large-lot balancing of mass-produced parts.

To this end the invention consists therein that the phase is continually changed by means of an auxiliary drive of a phase advancer and, on zero reading on the scale of the indicating instrument, the auxiliary drive is cut-out by means of an automatic switchgear and then another switchgear is cut-in which effects a 90° phase displacement.

In doing so it is the purpose to employ a D. C. measuring instrument as indicating instrument, which cooperates in known manner with a modulator which is fed by the two alternating currents, and which is preferably of such a type having the zero position in the middle of its scale. Further, the indicating instrument is preferably provided with a photo-electric control device which, in the zero position of the pointer, actuates a relay which in turn actuates the switchgear. An additional purpose is for the switchgear to operate an electro-magnetic clutch between the auxiliary drive and the phase advancer, so as to shut down the phase advancer at the moment at which the pointer is in the zero position. Instead of using an ohmic resistance to obtain the 90° phase displacement required for measuring the magnitude of the unbalance, this can be effected in a most simple manner by the switchgear connecting a suitable condenser to the alternating current circuit of the phase advancer. At the same time the switchgear may cause a signal light to come on for the purpose of indicating the completion of the balancing operation.

One form of construction of the invention is illustrated, by way of example, in the annexed drawings, in which—

Figure 1:
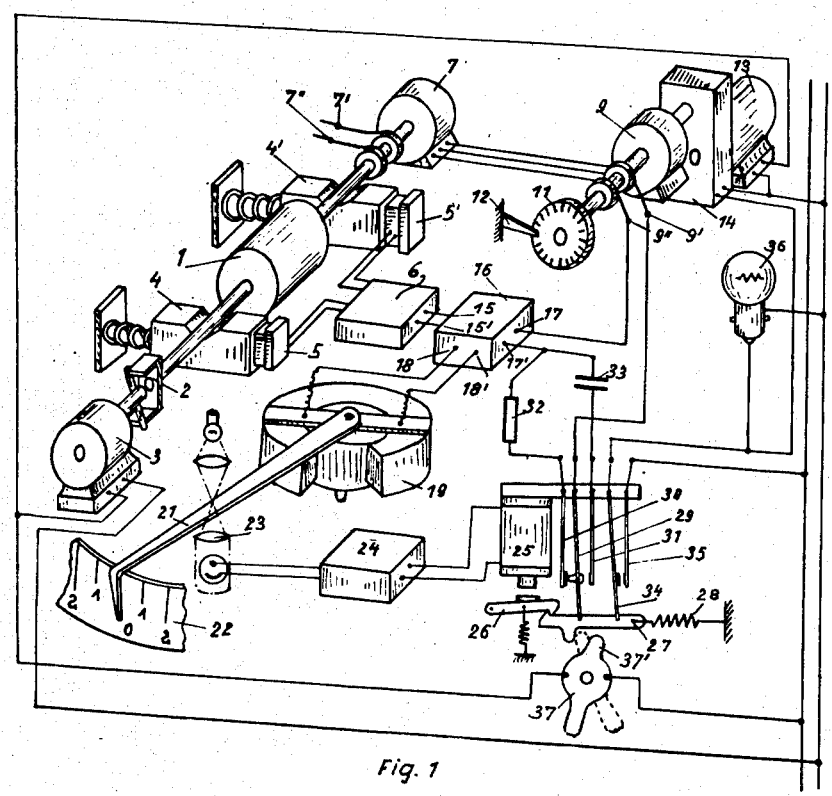
Fig. 1 is a diagrammatic and perspective view illustrating the balancing machine and automatic indicating device provided by the invention.

In the drawings, the numeral 1 represents the body to be balanced which is supported on two V-shaped bearings 4, 4' and driven from an electric motor 3 by means of a coupling 2. The force of unbalance which is formed on rotating of the body 1 is, by means of electro-mechanical transformers 5, 5', for instance, piezo-electric quartz, telescopic coils or the like, converted into corresponding alternating voltages which are in duplex connection and conducted to an amplifier 6 in known manner.

Methods and means for generating a measuring voltage from the voltages of the transformers 5, 5' arranged in the planes of support 4, 4' are known to everybody who is skilled in the art.

These methods are based essentially on the principle to tap by means of potentiometers partial voltages of the voltages generated by the transformers and to superimpose these partial voltages. Such an arrangement is explained in detail by way of example in the U. S. patent specification No. 2,165,024.

Coupled to the body 1 is a rotary-field converter 7 as will be hereinafter more fully described. The stator of the latter, as clearly shown in Fig. 3, has a rotary-field winding and a rotating armature 8 which through the poles 7', 7'' is supplied with direct current. The points of the triangle of the delta connection of the rotary-field winding are connected to corresponding points of a similar rotary-field system 9 whose armature winding 10 is connected to poles 9', 9''. A circular scale 11 divided in minutes of angles is secured upon the shaft of the rotary-field system 9 and cooperates with an indicator 12. The rotor 10 is driven from an auxiliary motor 13 through a train of reducing gears with built-in electromagnetic clutch 14.

As the armature 8 is rotated a rotating field is induced in the stators of the rotary-field systems 7 and 9. The latter in turn induces an auxiliary alternating current in the rotor 10 (which at first is to be thought of as standing still) the frequency of which conforms to the rotary frequency of the rotor 8, respectively body 1. The phase of this alternating current is continuously changed due to the low rotary speed of the rotor 10.

Figures 2, 3:
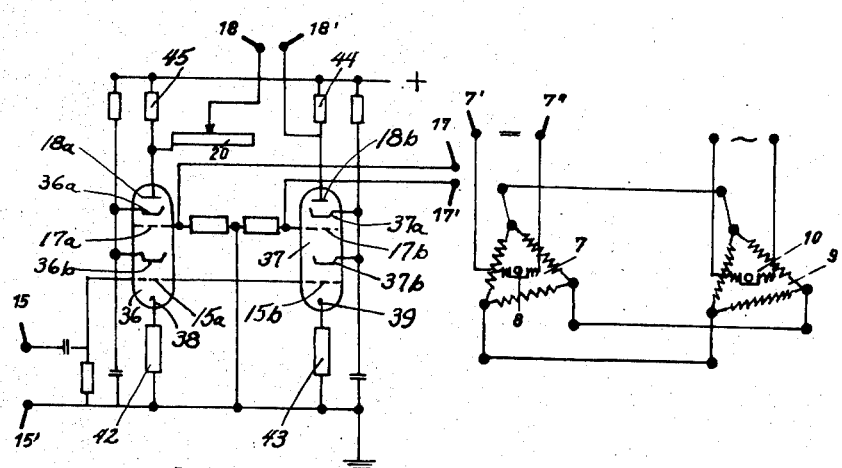
Fig. 2 is a wiring diagram of the modulator which in Fig.1 is shown as a closed box.
Fig. 3 is a wiring diagram of the rotary-field systems above described for generating the auxiliary alternating current and causing its phase displacement.

The alternating test current originating in the amplifier 6 is delivered to the poles 15, 15' of a known modulator 16, the wiring diagram of which is illustrated in Fig. 2. The auxiliary alternating current taken from the poles 9', 9'' is likewise delivered to modulator 16 through the poles 17, 17', and so, through a change-over switchgear, as will be hereinafter more fully described. A D. C. measuring instrument 19 is connected to the poles 18, 18' of the modulator 16. The connection of the valve modulator 16 is known. Such a connection has been represented in Fig. 2 and merely is given as an example. This connection substantially comprises the following elements: The two modulating tubes 36 and 37 each has one cathode 38 or 39 and one anode 18a and 18b, moreover each of the modulating tubes has two control grids 15a and 17a or 15b and 17b. The reference characters 36a and 36b and also 37a and 37b designate screen grids the task of which is merely to improve the performance of the tube. Between the cathodes 38 or 39 and the anodes 18a or 18b a voltage acts through protective resistors 42 and 45 or 43 and 44. The test current across the poles 15, 15' is connected in phase with the grids 15a and 15b of the modulator tubes, whereas the auxiliary alternating current across the poles 17, 17' is connected out of phase with the second grids 17a, 17b of the modulator tubes. In this circuit, as is known, a difference of potential is produced across the anodes 18a, 18b of the modulator tubes which is dependent upon the phase relation of the two alternating voltages as to each other. This difference of potential on the poles 18, 18' will be zero, if there is a 90° or 270° phase displacement of the auxiliary current on the poles 17, 17' as compared with the alternating test current on the poles 15, 15'. However, if the phase displacement is 0° or 180° there will be a maximum deflection of the pointer on the scale of the D. C. instrument either to the right or to the left. The voltage delivered to the instrument 19 can be set by means of a potentiometer 20 in the modulator 16.

The zero position of the pointer 21 is in the middle of the scale 22. As the pointer 21 is in zero position a relay 25 is actuated through a photo-cell amplifier 24 by known photo-electric cell controls 23. The relay contact maker 26 then releases a switch member 27 which is under the effect of a tension spring 28. A contact spring 29 connected with the switch member 27 is also connected to the pole 9'. The contact spring 29 is in working contact either with the contact spring 30 or 31. The contact spring 30 is connected through an ohmic resistance 32 to the modulator pole 17', and similarly the contact spring 31 through a condenser 33. The magnetic clutch 14 and a signal lamp 36 can be connected to the line voltage by means of another pair of contact springs 34, 35 which are actuated by the switch member 27. On energization of the clutch 14 the same will be released and the rotor 10 of the phase advancer 9 will be stopped. On switching off the switch member 27 is returned and its spring 28 is put in tension by a nose 37' of the main switch.

The principle of action of the arrangement above described is the following: As the main switch is switched on, the body 1 to be balanced begins to rotate. Thereby an alternating test current is generated, on the one hand, on the poles 15, 15' and an auxiliary alternating current on the poles 9', 9'', on the other hand, the phase of which is slowly continuously displaced by means of the driving motor 13. Along with this the ohmic resistance 32 is connected through the contact springs 29, 30 to the circuit of the auxiliary alternating current. As soon as there is a phase displacement of 90° or 270° between testing current and auxiliary current the pointer 21 proceeds to zero whereby the relay 25 is actuated and releases the contact maker 26. By means of the release of the switch member 27 contact is established from 34 to 35 whereby the clutch 14 is thrown out and the armature 10 brought to a standstill. At the same time the signal lamp 36 comes on. The position of the rotor 10 at the moment of standstill is now indicated on and can be read from the scale 11 and the location of the unbalance thus be derived therefrom.

However, simultaneously with the release of the switch member 27 contact between 29 and 30 is interrupted and in place thereof contact between 29 and 31 established. Instead of the ohmic resistance 32 there is now the condenser 33 in the circuit of the auxiliary alternating current and effects 90° phase displacement. As a necessary result of the above there will be a deflection of the pointer 21 either to the left or to the right according as to whether the zero reading previously obtained was due to a phase displacement of 90° or to such a one of 270°. This deflection is proportional to the magnitude of the unbalance. The coefficient of proportionality, i. e., the proportion between deflection and the force of unbalance determined by the radius of unbalance, can now be set on the potentiometer 20 and the quantity of unbalance be read on the scale 22 directly in gram amounts.

Various modifications in the method and device hereinbefore described will be apparent and may readily be made without departing from the spirit of the present invention. As has been pointed out, the teaching of the present invention is not confined solely to devices employing the described modulator connection and the described manner of phase displacement and change-over as these functions are obtainable also by other means. The described relay control is also not restricted to photo-electric cell means but any known form of control device may be employed.

What is claimed is:

1. Balancing machine for ascertaining the unbalance of a revolving body comprising electro-mechanical transformers subjected to the forces of unbalance generating an alternating current proportional to the unbalance, an alternating current generator rotating with said body and adapted for generating an auxiliary alternating current, an indicating device supplied with said two alternating currents and indicating the product of said alternating currents with regard to their relative phase there being electric circuits connecting said device with said transformers and generator, means for changing the phase of one of said alternating currents continuously and measurably interposed in one of the alternating current circuits, an auxiliary drive for said phase changing means including an electric energizing circuit, a control device cooperating with said indicating device, a relay actuated by said control device on zero indication of said indicating device, a switchgear released by said relay, said switchgear interposed in the circuit of said auxiliary drive and switching off said auxiliary drive, and means for a phase displacement of 90° connectable to one of said alternating current circuits by said switchgear simultaneously with the switching off action of said auxiliary drive.

2. Balancing machine for ascertaining the unbalance of a revolving body comprising electro-mechanical transformers subjected to the force of unbalance generating an alternating current proportional to the unbalance, an alternating current generator rotating with said body and adapted for generating an alternating current, a modulator for multiplicatively compounding said alternating currents connects to the circuits of said alternating currents, there being electric circuits connecting said modulator with said transformers and said generator, a direct current indicating instrument having its zero point in the middle of its scale connected to said modulator, means for changing the phase of one of said alternating currents continuously and measurably interposed in one of the alternating current circuits, an auxiliary drive for said phase changing means including an electric energizing circuit, a control device cooperating with said indicating device, a relay actuated by said control device on zero indication of said indicating device, a switchgear released by said relay, said switchgear interposed in the circuit of said auxiliary drive and switching off said auxiliary drive, and means for a phase displacement of 90° connectable to one of said alternating current circuits by said switchgear simultaneously with the switching off action of said auxiliary drive.

3. Balancing machine for ascertaining the unbalance of a revolving body comprising electro-mechanical transformers subjected to the forces of unbalance generating an alternating current proportional to the unbalance, a rotary-field system whose rotor is supplied with direct current and rotates with said body to be balanced, another rotary-field system electrically connected in parallel with said first rotary-field system and including another rotor, an auxiliary drive for the rotor of said last named rotary-field system, an electro-magnetic clutch between said auxiliary drive and said last named rotor and an energizing circuit therefor, an angle indicating device upon the shaft of said last named rotor, said angle indicating device having a scale divided in minutes of angle, an indicating device supplied on the one hand with said alternating current which is proportional to the unbalance and on the other hand with the alternating armature current in the rotor of said last named rotary-field system there being electric circuits connecting said device with said transformers and said last named rotor, said indicating device indicating the product of said alternating currents with regard to their relative phase, a control device cooperating with said indicating device, a relay actuated by said control device on zero indication of said indicating device, a switchgear in said energizing circuit released by said relay and adapted to operate said electro-magnetic clutch, and means for causing a phase displacement of 90° connectable to one of said alternating current circuits by said switchgear simultaneously with the operation of said clutch.

References Cited in the file of this patent

UNITED STATES PATENTS

| Number | Name | Date |
|---|---|---|
| 2,118,770 | Sivertsen | May 24, 1938 |
| 2,362,842 | Mueller | Nov. 14, 1944 |